No Printed Specification Available
9226X
J. Elgar.
Towing.
Patented Nov. 7, 1835.
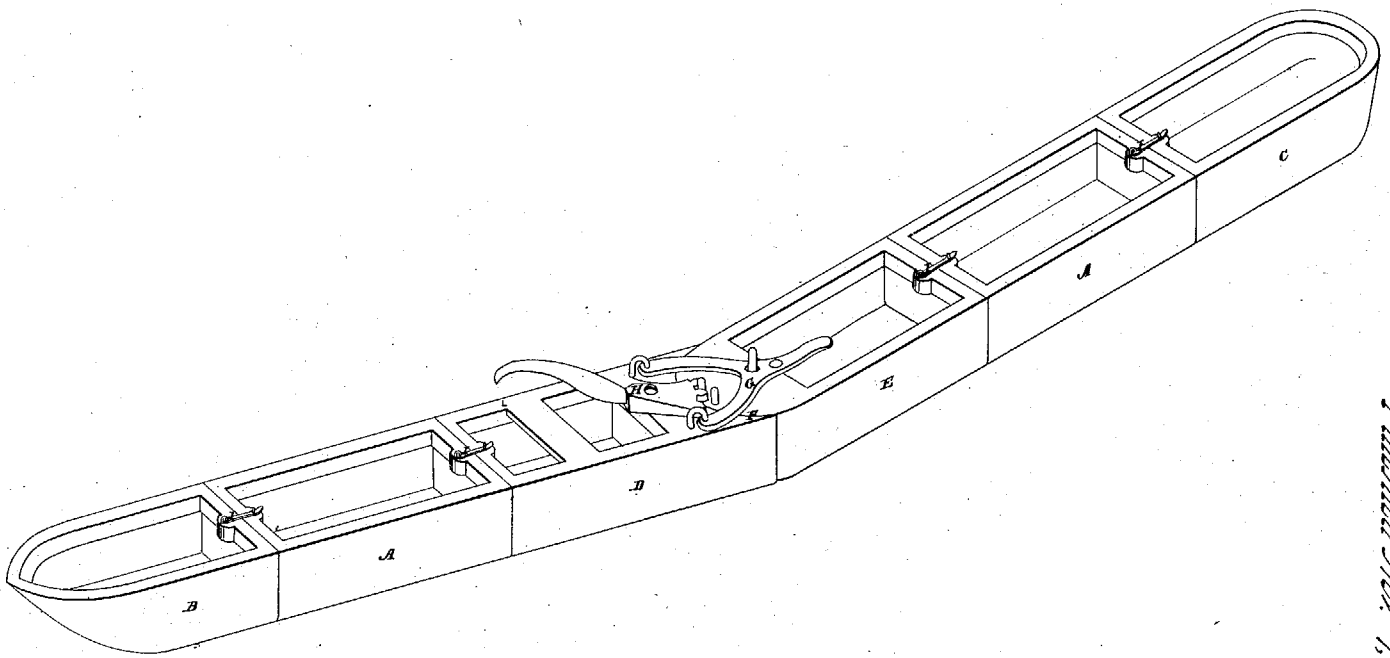
N. PETERS, PHOTO-LITHOGRAPHER, WASHINGTON, D. C.

9026X (Extended for 7 years from 7 November 1849) {Re-issued 25 December} Nov. 14. 1835 56

John Elgar of the City of Baltimore and State of Maryland

The schedule referred to in these Letters Patent and making part of the same containing a description in the words of the said John Elgar himself of his Improvement in the Art of, and apparatus for, the transportation of goods on Canals and rail roads. ______

To all whom it may concern, ______

Be it known that I John Elgar of the City of Baltimore in the State of Maryland, have invented certain improvements in the art of, and in the apparatus for the conveyance or transportation of Goods on a line where Canals and Rail Roads form alternate links in the chain of communication, as for example on the great Pennsylvania line from Philadelphia to Pittsburg, a part of which invention or improvement may be applied to the construction of and transportation in Canal Boats on those lines in which the mode of conveyance is by water alone, and I do hereby declare that the following is a full and exact description of my said improvement or invention. ______

______ The object which I have in view in the first instance is to prevent the necessity of removing the goods from the vehicle within which they are first loaded, by constructing cases which serve on Rail Roads as car bodies and on Canals as boats. This I effect by making such vehicles, or car bodies, of sheet iron in the manner of iron tanks, riveting them up water tight in the same way. ______ The dimensions of these bodies must be determined by that of the Canal locks through which they are to pass when used as boats. If for example the lock will admit a boat of fourteen feet in width and eighty in length, the bodies may be made seven feet wide and twenty feet long so that eight bodies two abreast and four in length may pass at the same time. I intend sometimes to make the bodies wholly of sheet iron, but they may be made of that material to the height of about three feet only with an additional height say of three feet made of wood. ______ The bodies when made of this length are to be carried upon eight wheeled cars. If four wheeled cars are preferred the bodies must be made of a length suitable suitable wheels, and a greater number of them will then of course be con-
-nected together when in the water. ——— As these bodies are by their
combination to form Canal Boats, the requisite number of them are to be
so formed at one end as to constitute a well shaped bow, and the same
number are to be so shaped as to constitute a stern, the other ends are to
be made square so that when connected by proper fastenings they will
be in one continuous inflexible line to the length of the lock through -
which they are to pass. ——— It is a well known fact that the resistance
to a boat moving thro' the water is nearly as the cross section of the part im-
-mersed, without regard to length, and I contemplate the obtaining a
great advantage from the application of this principle in the conversion
of Car bodies into Canal Boats, as they are to be made but half the width
of an ordinary boat, their draught being the same their cross section will
be but one half. I contemplate therefore the coupling of these bodies
together in one continuous line, without placing them side by side
excepting when they are passing through Locks by which means but
one half the power of traction ordinarily required will be found ne-
-cessary the foremost and hindmost bodies constituting a Stem & Stern.
——— The great length given to the combined boat in this case, will
render it necessary to make provision for passing along those parts of
the canal where there is any considerable curvature. For this purpose I
construct a certain number of the bodies in such a manner as that
when coupled so as to constitute a Canal boat they will form a rule
joint, which will allow of the requisite lateral motion to conform them
to the curvature of the Canal. To make such a joint the end of one of the
bodies composing it must terminate in the concave arc of a Semicircle
and that of the corresponding one in a convex semicircle adapted to each
other. The distance apart of these flexible joints should be equal to that
of an ordinary Canal boat, so that when detached they will pass side
by side through Locks. These rule joint sections are to be coupled together
by a connecting bar which falls or is placed, on a strong upright pin -
fixed in the centre of the circumference of the joint or in any other con-
-venient

9226X

-venient mode ——— To cause the boats so connected to conform to the curvature of the canal, and to steer them, by making one act as a rudder to the other, I fix a wheel and pinion, or adapt a lever, or other power at each rule joint so as to communicate the requisite degree of flexure. A compound boat of any desired length may thus be formed and managed, — the first of the series of sections only being bow formed and the last only stern forward ment. ——— The bodies may be transferred from the cars to the water, and from the water to the cars by means of powerful cranes, but the mode which I intend in general, to adopt, is, to extend the rail way down into the canal basin in the manner practiced in marine rail ways, the bodies may thus be made to float from and on to, the cars with the utmost facility ——— The rule joint and mode of steering I also intend to apply to Canal Boats of the ordinary construction and length but reduced in breadth one half, so that in passing through locks the Boats may be disconnected at the joints, and pass through in pairs side by side, thus obtaining the advantage before alluded to as resulting from the diminution of the cross section and admitting of an increased velocity with a decreased injury to the banks of the Canal, ——— What I claim as my invention in the within described Art of, and apparatus for, the conveyance or transportation of Goods on lines of Canal and rail road, is the constructing of Car bodies in the manner set forth, so that they may be converted into Canal boats — upon the principle and for the purposes herein fully described and specified. I also claim the connecting of such, or other canal boats by rule joints, for the purpose of adapting them to the curvature of the Canal, and of steering them by their action upon each other, upon the same principle with that by which a rudder, is made to steer — an ordinary boat.

Witnesses
C. H. W. Wharton
Henry Stone.

Jno. Elgar (1200 words)

Patented November 7, 1835.

(Drawing)